Feb. 20, 1951   L. A. WINKLER   2,542,608
ASPHALT PAINT
Filed June 14, 1949
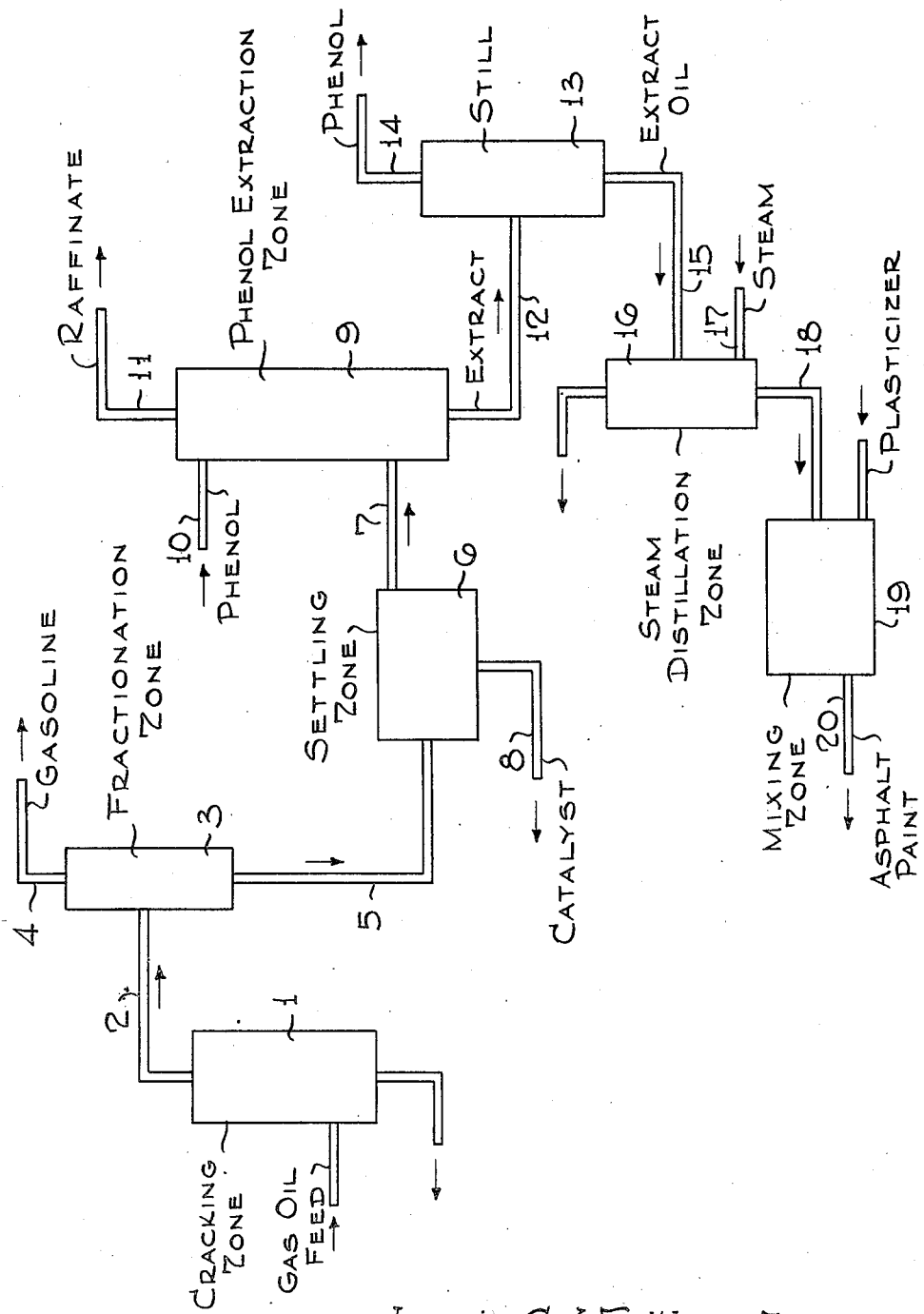
Lewis A. Winkler Inventor
By W. O. Heilman Attorney

Patented Feb. 20, 1951

2,542,608

UNITED STATES PATENT OFFICE 2,542,608

ASPHALT PAINT

Lewis A. Winkler, Scotch Plains, N. J., assignor to Standard Oil Development Company, a corporation of Delaware Application June 14, 1949, Serial No. 99,079

4 Claims. (Cl. 106—246)

This invention relates to a novel composition of matter consisting of an oil resistant asphalt paint. The composition of this invention is particularly adapted for use on surfaces subjected to attack by oils. In accordance with this invention, compositions are prepared consisting of blends of asphaltic bottoms obtained from the steam reduction of a phenol extract of catalytically cracked cycle stock together with a plasticizer which is compatible with asphalt but is insoluble in mineral oils.

Frequently asphalt surfaces are used under such conditions as to be subject to the action of varying types of oils. For example, the asphalt pavements frequently to be found around service station islands are exposed to gasoline, or oils dropped thereon. Again, asphalt runways used to service jet planes may deteriorate by exposure to jet fuels, or lubricating oils. Consequently, a need exists for treating asphalt pavements so as to resist their corrosion in the presence of oils. It is, therefore, a principal object of this invention to provide an asphaltic type paint which may be used to cover asphalt surfaces to render these substantially impervious to the attack of gasoline, lubricating oils, naphtha, heavy fuel oils, etc.

More generally, it is the object of this invention to provide a composition which may be used as an asphaltic type coating composition and which is not subject to solution in oils. In this connection, for example, the composition of this invention may be used to coat pipe lines.

The composition herein disclosed, as being of a nature to attain these objectives consists of a particular type of asphaltic material admixed with a suitable plasticizer. The asphaltic type material is specifically chosen from a particular source involving certain essential processing steps so as to result in an asphaltic composition having the desired properties. This asphaltic component of the composition of this invention may be derived from "cycle stock." As this term is used in the petroleum industry, cycle stock identifies the heavy gas oil remaining after an initial feed stock has been subjected to cracking processes. Thus, in the case of catalytic cracking, the feed stock generally constitutes a gas oil boiling in the range of about 450 to 900° F. This feed stock is contacted in vapor phase with a catalyst at temperatures of about 900° to 1400° F. utilizing contact times of about 2 to 60 seconds and pressures of about atmospheric to 400 p. s. i. The catalyst is preferably an adsorbent such as alumina or magnesia containing oxides or sulfides of the group III to VIII metals. As a result of the cracking operation about 40% or more of this gas oil is converted to gasoline, while the remainder of the initial gas oil undergoes various cracking and polymerization reactions to form an oil having an A. P. I. gravity of about 0° to 20°, a mid boiling point of about 700–850° F., an aromatic content of about 30–60%, an aniline point of about 20–180° F. and a specific dispersion of about 180–290. This oil is known as cycle oil and it is this material from which the asphaltic component of this invention is derived.

Cycle oil of the general nature identified is then subjected to contact with phenol. This process is generally referred to as a phenol extraction process in which the oil to be treated is intimately admixed with phenol in a manner to permit the selective removal of aromatic type compounds by the phenol. Frequently this process is conducted in counter-current liquid-liquid extraction towers in which the phenol is introduced at the top of the tower to move counter-currently downwardly against a flow of oil introduced at the bottom of the tower. Perforated plates may be employed in the tower, packing material may be utilized or other means may be adopted to improve the contacting of the phenol and oil. Similarly, other expedients can be used to improve the contacting efficiency, such as for example maintaining a temperature gradient along the phenol extraction tower. It is this general type of phenol treating process which is suitable for the treatment of cycle oil in accordance with the process of this invention. The amount of phenol to be used in the phenol extraction step of the process ranges from about 70% of phenol, based on the oil, to about 250% or more if desired. The temperature to be used is in the range of about 120 to 175°, and is preferably about 135° F., at atmospheric pressure. By suitably contacting phenol with cycle oil in the manner indicated, it is possible to secure an extract phase; that is a phenol phase containing extracted constituents of the cycle oil, amounting to about a 50% yield. The oil extract may be separated from the phenol by distillation, yielding an asphaltic rich material which is used in the composition of this invention.

In accordance with this invention the asphaltic extract derived from the phenol extraction of a cycle oil is reduced to a softening point of about 145° F. The reduction may be accomplished by a suitable distillation operation in which about 65% of the more volatile constituents are removed. A preferred manner of accomplishing this end is to subject the extract to steam distillation whereby an asphaltic material may be obtained having a softening point of about 145° F.

This asphaltic material is then admixed in suitable proportions with a plasticizer so as to have desirable properties as an oil resistant asphaltic composition. The plasticizer used must be compatible with asphalt and substantially insoluble in mineral oils. The plasticizer may consist of a non-drying animal or vegetable oil exhibiting constants within the following ranges: saponification value, 175–200; iodine value, 60–100; acetyl value, 50–150; acid value of fatty acids, 190–205. The preferred plasticizer for use according to this invention is castor oil, having a saponification value of 175-183; an iodine value of 84; an acetyl value of 146-150; and an acid value of fatty acids, 192. The quantity of plasticizer to be used will be in the range of about 8 to 25%, based on the weight of the finished composition. A preferred composition is one having about 10% of castor oil admixed with 90% of the asphaltic constituents derived as indicated above. This particular composition is one having properties closely similar to those of a paving asphalt and is well adapted for serving as a hot mix asphalt covering composition.

The nature of this invention will be more fully understood by reference to the accompanying drawing diagrammatically illustrating a flow plan of a suitable process for obtaining the compositions of this invention. Referring to the drawing, the numeral 1 represents a cracking zone. The process carried out in zone 1 constitutes a catalytic cracking operation as carried out in accordance with the conventional procedures known to the art. Similarly, the feed stocks to this zone are chosen from those ordinarily selected as cracking feed stocks. In a typical example the feed stock consisted of a mixture of 50% of Texas heavy gas oil and 50% of a high boiling oil produced by vacuum flashing the 16% residuum from a West Texas crude oil. This composite feed stock had a boiling range of about 620° F. to 975° F., and was contacted in vapor phase utilizing a catalyst consisting of 12% of $Al_2O_3$ and 88% of $SiO_2$. The cracking process was operated at 900° F. and 15 p. s. i. to obtain a conversion of about 55%. The products of catalytic cracking together with a small amount of entrained catalyst may be withdrawn through line 2 and introduced to a fractionator 3, where the gasoline derived from the cracking process may be withdrawn overhead through line 4. The material not driven overhead, having a maxmum boiling point of 900° F.+, may be withdrawn as a bottoms product from the fractionator through line 5. This heavy boiling material mixed with some catalyst from zone 1, is withdrawn from fractionator 3 as a slurry.

By passing this slurry to a suitable settling zone, such as a Dorr thickener identified by the numeral 6, the catalyst may be separated from the oil to permit removal through line 7 of what is known as cycle oil. The catalyst may similarly be removed through line 8 for regeneration and recycle to zone 1 if desired. In the case in which the feed to the cracking zone was of the nature identified, the cycle oil had the characteristics given in Table I.

*Table I*

| | |
|---|---:|
| Grav., °API | 15.3 |
| Distillation: | |
|     IBP, °F | 499 |
|     2% at., °F | 627 |
|     10% at., °F | 686 |
|     50% at., °F | 759 |
|     90% at., °F | 905 |
| Distillation discontinued at., °F | 905 |
| Vol. percent overhead | 90.0 |
| Aniline point, °F | 161 |
| Specific dispersion | 249 |
| Flash, °F | 390 |
| Pour, °F | 70 |
| Vis. at 150° F., SSU | 734 |
| Vis. at 210° F., SSU | 44.6 |
| Insol. in 86° naphtha, percent | 2.92 |
| Sol. in $CS_2$, percent | 99.92 |

The cycle oil of line 7 is then passed to a phenol extraction tower, diagrammatically illustrated as zone 9. The cycle oil is introduced near the bottom of zone 9 to move counter-currently to a flow of phenol introduced near the top of zone 9, through line 10. In a specific example in which the cycle oil of Table I was treated, the ratio of phenol to oil was 150% and a temperature of 135° F., was maintained at the top of zone 9, while a temperature of 115° F., was maintained at the bottom of zone 9. The tower used was sufficiently high to provide about 7 contacting stages. The oil phase, called the raffinate, withdrawn through line 11 at the top of zone 9 was withdrawn and used for purposes not connected with this invention. The phenol rich phase called the extract phase was withdrawn through line 12 and was conducted to a still 13. This still was operated so as to drive phenol overhead through line 14 leaving the purified extract oil to be removed from the bottom of fractionator 13, through line 15 as a bottoms product. In the example given in which a 150% phenol treat was employed to treat the cycle oil of Table I, the yield of extract oil obtained was 57 volume percent based on a feed of 100 volumes of cycle oil. This extract oil had the properties indicated in Table II.

*Table II*

| | |
|---|---:|
| Gravity, °API | 3.9 |
| Flash (COC), °F | 405 |
| Pour point, °F | 70 |
| SSU/130° F | 291 |
| SSU/210° F | 57.8 |

The extract oil may then be conducted to a steam distillation zone 16 wherein volatile constituents of the extract oil are removed by exposure to steam introduced to the bottom of zone 16 through line 17 at a temperature of about 400° F. and about atmospheric pressure. This steam reduction is to be conducted until the extract oil has a softening point of 145° F., consisting principally of asphaltic constituents. In the specific example of reducing the extract oil of Table II to a softening point of 145° F., a composition was obtained having the properties indicated in Table III.

*Table III*

| | |
|---|---:|
| Specific gravity at 60° F | 1.204 |
| Flash (COC), °F | 470 |
| Softening point, °F | 145 |
| Pen. 77°/100 g./5″ | 3 |
| Sol. in $CS_2$, per cent | 94.5 |
| Insol. in 86° naphtha, per cent | 78.9 |
| Fixed carbon, per cent | 21.6 |
| Furol V/250° F., sec | 217 |
| Furol V/300° F., sec | 42.5 |

This reduced oil may then be withdrawn from zone 16 through line 18 for admixture with a plasticizer oil in zone 19. The final product removed through line 20 is a composition well adapted for use as an oil resistant asphalt paint. This is indicated by the data of Table IV showing the characteristics obtained by blending 10% of castor oil with 90% of the composition indicated in Table III.

*Table IV*

| | |
|---|---:|
| Softening point, °F | 127 |
| Pen. 77°/100 g./5″ | 29 |
| Pen. 32°/200 g./60″ | 3 |
| Duct. at 77° F. cm | 100+ |
| Insol. in 86° naphtha, per cent | 95.15 |
| Impact at 40° F. in | 0.5 |

From a consideration of these properties it will be found that they closely resemble those of paving asphalts and are particularly notable in that the composition is substantially insoluble to oil solvents as indicated by the solubility in naphtha data. It is apparent from these properties that this specific composition and compositions of the nature indicated are well adapted for use as asphalt paints. Particularly because of the sharp change of viscosity with temperature, the composition can be heated so as to permit convenient application.

While the process and composition of this invention has been described with particular reference to the phenol treating of cycle oil it will be understood that solvents other than phenol may be employed. Thus solvents such as sulfur dioxide, furfural, nitrobenzene and others known to the art may be employed. It is only necessary that the solvent used be capable of selectively extracting aromatic constituents from the cycle oil in order to obtain the extract to be used in the composition of this invention.

What is claimed is:

1. A coating composition consisting essentially of about 8% to 25% of a non-drying oil compatible with asphalt and substantially insoluble in mineral oils and about 92% to 75% of a phenol extract of "cycle oil" having a softening point of about 145° F.

2. The composition defined by claim one in which the said oil is castor oil.

3. A coating composition consisting essentially of about 75% to 92% of a phenol extract of "cycle oil" having a softening point of about 145° F. and about 25% to 8% of a non-drying oil compatible with asphalt and substantially insoluble in mineral oil having a saponification value of about 175–200; an iodine value of about 60–100; an acetyl value of about 50–150; and an acid value of fatty acids of about 190–205.

4. The process of manufacturing an asphaltic coating composition comprising the steps of contacting a catalytically cracked "cycle oil" with phenol and separating the said phenol after the contacting whereby a phenol extract phase is obtained, distilling the phenol from the said phenol extract phase whereby an extract oil phase is obtained, and eliminating volatile constituents of the said extract oil phase to obtain an asphaltic composition having a softening point of about 145° F. and thereafter mixing about 75% to 92% of the said asphaltic composition with a non-drying oil compatible with asphalt and substantially insoluble in mineral oil having a saponification value of about 175–200; an iodine value of about 60–100; an acetyl value of about 50–150; and an acid value of fatty acids of about 190–205.

LEWIS A. WINKLER.

No references cited.